(12) United States Patent
Kondo

(10) Patent No.: US 6,222,834 B1
(45) Date of Patent: Apr. 24, 2001

(54) SPREAD SPECTRUM COMMUNICATION RECEIVER

(75) Inventor: Takayuki Kondo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/072,045

(22) Filed: May 5, 1998

(30) Foreign Application Priority Data

May 7, 1997 (JP) .................................................. 9-117206

(51) Int. Cl.$^7$ .................................................. H04B 7/216
(52) U.S. Cl. ............................................ 370/342; 375/149
(58) Field of Search .................................... 370/320, 324, 370/335, 342, 350, 203, 204; 455/434, 466; 375/130, 134, 140–145, 147, 149, 150, 152

(56) References Cited

U.S. PATENT DOCUMENTS 5,982,763 * 11/1999 Sato ..................................... 370/342

FOREIGN PATENT DOCUMENTS

| 0 718 998 A2 | 6/1996 | (EP) . |
| 3-3530 | 1/1991 | (JP) . |
| 5-175935 | 7/1993 | (JP) . |
| 5-327688 | 12/1993 | (JP) . |
| 6-37736 | 2/1994 | (JP) . |
| 7-50613 | 2/1995 | (JP) . |
| WO 95/12262 | 5/1995 | (WO) . |

* cited by examiner

Primary Examiner—David R. Vincent
(74) Attorney, Agent, or Firm—McGinn & Gibb, PLLC

(57) ABSTRACT

A spread spectrum communication receiver includes a spread code generating section, a receiver, a searcher, a tracking section, a path capturing/holding section, a correlation demodulation path selection section, a rake section, and a decoder section. The searcher obtains search paths separated by one chip or more. The tracking section tracks tracking paths separated by one or more chip on the basis of the demodulated signal and the spread code, and obtains the correlation levels of the paths. The path capturing/holding section compares the search paths with the tracking paths to capture/hold paths, provides backward protection in detecting the coincidence between paths and forward protection in detecting the loss of a path, and classifies path captured/held states of tracking paths into a complete incoincident state, a forward protection state, a complete protection state, and a forward protection state, thereby obtaining a path state. The correlation demodulation path selection section selects paths to be subjected to correlation demodulation on the basis of the path state and the correlation levels. The rake section detects demodulated paths, and performs rake synthesis of the demodulated paths. The decoder section decodes the demodulated data and outputs the decoded data.

10 Claims, 6 Drawing Sheets

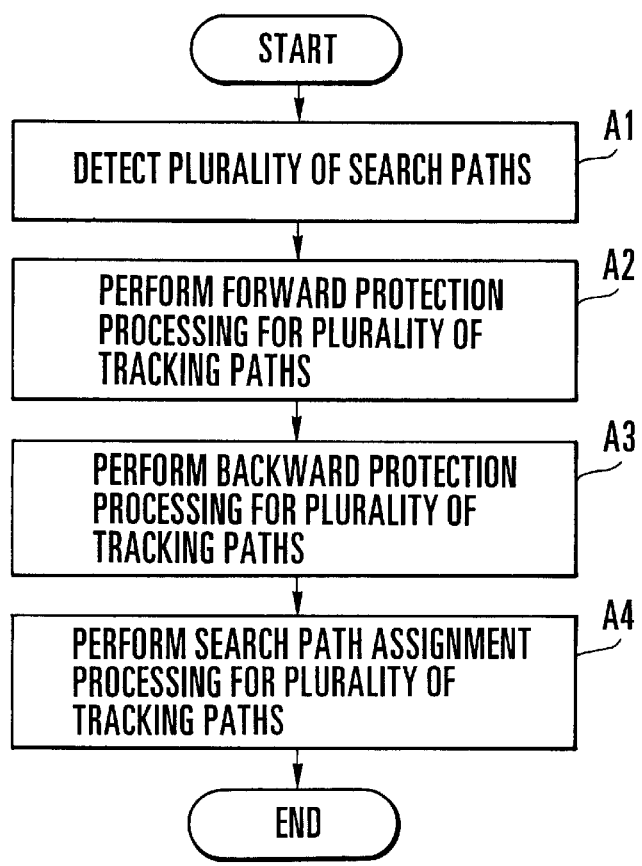
F I G. 2
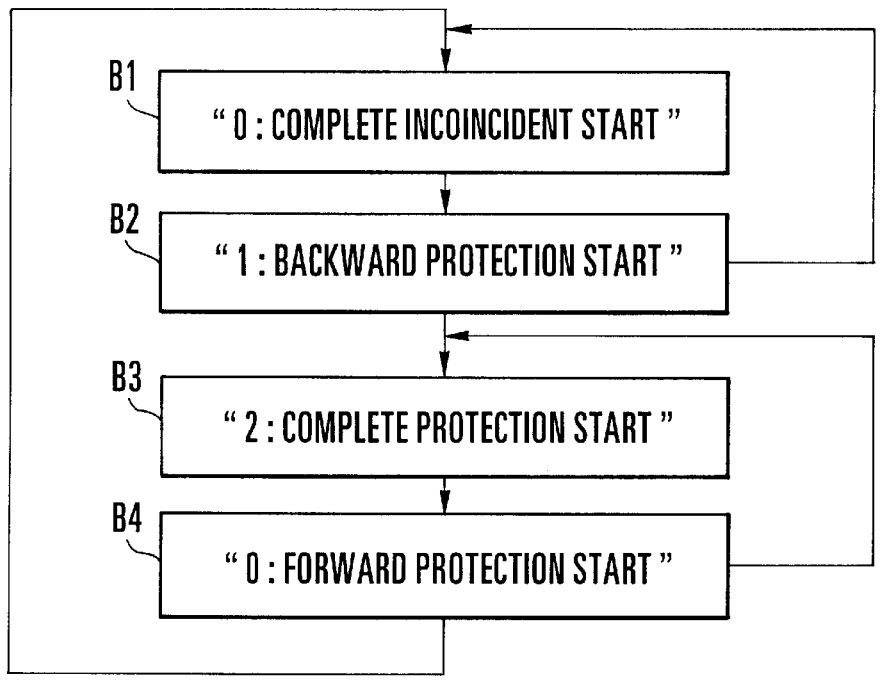
F I G. 3

SPREAD SPECTRUM COMMUNICATION RECEIVER

BACKGROUND OF THE INVENTION

The present invention relates to a spread spectrum communication receiver and, more particularly, to a synchronizer circuit based on a correlation demodulation scheme.

FIG. 7 shows a spread spectrum communication receiver based on a conventional correlation demodulation scheme. Referring to FIG. 7, a received signal is input to a detection correlator 11 and a plurality of peak detection correlators 20. The detection correlator 11 outputs a correlation value relative to a spread code in the chip phase designated by an up-down counter 80. A detector 12 detects the output signal from the detection correlator 11. A decoder 13 decodes the output signal from the detector 12.

The peak detection correlator 20 calculates a correlation value at each sampling point within one period of the spread code. The output from the peak detection correlator 20 is input to an integration circuit constituted by a plurality of adders 30 and a plurality of memories 40. The output from the integration circuit is input to a peak position detector 50. The detected peak position is input, through a switch 60, to a peak position memory 70 in the initial mode, and to a peak comparator 71 in the steady mode.

In this case, the peak comparator 71 performs control to minimize the difference between the peak position within one period of the spread code and the value stored in the peak position memory 70. More specifically, the peak comparator 71 outputs "+1" when the peak position within one period of the spread code is larger than the value in the peak position memory 70; outputs "−1" when the peak value is smaller than the stored value. The up-down counter 80 sequentially adds the outputs from the peak comparator 71. The value in the up-down counter 80 is output to the detection correlator 11. The chip phase of the detection correlator 11 is controlled in accordance with this value, thereby holding synchronization.

A synchronization device for a spread spectrum communication receiver using such a correlation demodulation scheme is disclosed in Japanese Patent Laid-Open No. 7-50613.

In a conventional spread spectrum communication receiver having such an arrangement, when a path for a received signal is to be detected, the reception levels in the entire search range are integrated over a plurality of periods, thereby facilitating detection of a path.

According to this method, however, when a plurality of paths in a multipath fading state in which the reception levels are low and greatly vary are to be detected, detection errors cannot be satisfactorily suppressed. For this reason, erroneously detected paths are also demodulated.

Assume that the correlation level of a received signal is as low as a noise level. In this case, if an instantaneous peak is set as a chip phase for correlation demodulation, a correlation peak cannot be detected owing to the influences of noise and fading. For this reason, peaks based on noise without any correlation component are frequently detected, resulting in a deterioration in demodulation characteristics.

SUMMARY OF THE INVENTION

It is an object of the present invention to provide a spread spectrum communication receiver which suppresses erroneous detection of correlation peaks and prevents a deterioration in demodulation characteristics even if a correlation level is as small as a noise level.

It is another object of the present invention to provide a spread spectrum communication receiver which efficiently selects paths to be used for correlation demodulation when a plurality of paths are to be subjected to correlation modulation.

In order to achieve the above objects, according to the present invention, there is provided a spread spectrum communication receiver comprising spread code generating means for generating a spread code, demodulation means for demodulating a received signal and outputting a demodulated signal, searcher means for obtaining a plurality of search paths separated from each other by not less than one chip from a search range on the basis of the demodulated signal output from the demodulation means and the spread code output from the spread code generating means, tracking means for tracking a plurality of tracking paths separated from each other by not less than one chip on the basis of the demodulated signal output from the demodulation means and the spread code output from the spread code generating means, and obtaining correlation levels of the tracking paths, path capturing/holding means for comparing the search paths output from the searcher means with the tracking paths output from the tracking means, and capturing/holding a plurality of paths on the basis of the comparison result, the path capturing/holding means performing backward protection in detecting coincidence between paths, performing forward protection in detecting loss of a path, and classifying path captured/held states of tracking paths into a complete incoincident state, a forward protection state, a complete protection state, and a forward protection state, thereby obtaining a path state, correlation demodulation path selection means for selecting paths to be subjected to correlation demodulation on the basis of the path state output from the path capturing/holding means and the correlation levels output from the tracking means, rake means for detecting demodulated paths designated by the correlation demodulation path selection means on the basis of a correlation between the demodulated signal output from the demodulation means and the spread code output from the spread code generating means, and performing rake synthesis of the demodulated paths, thereby outputting demodulated data, and decoding means for decoding the demodulated data output from the rake means, and outputting decoded data.

BRIEF DESCRIPTION OF THE DRAWINGS

FIG. 2 is a flow chart for explaining the tracking path acquiring and holding operation of a path capturing/holding section;

FIG. 3 is a flow chart for explaining tracking path state transition in the receiver in FIG. 1;

DESCRIPTION OF THE PREFERRED EMBODIMENTS

The present invention will be described in detail below with reference to the accompanying drawings.

Figure 1:
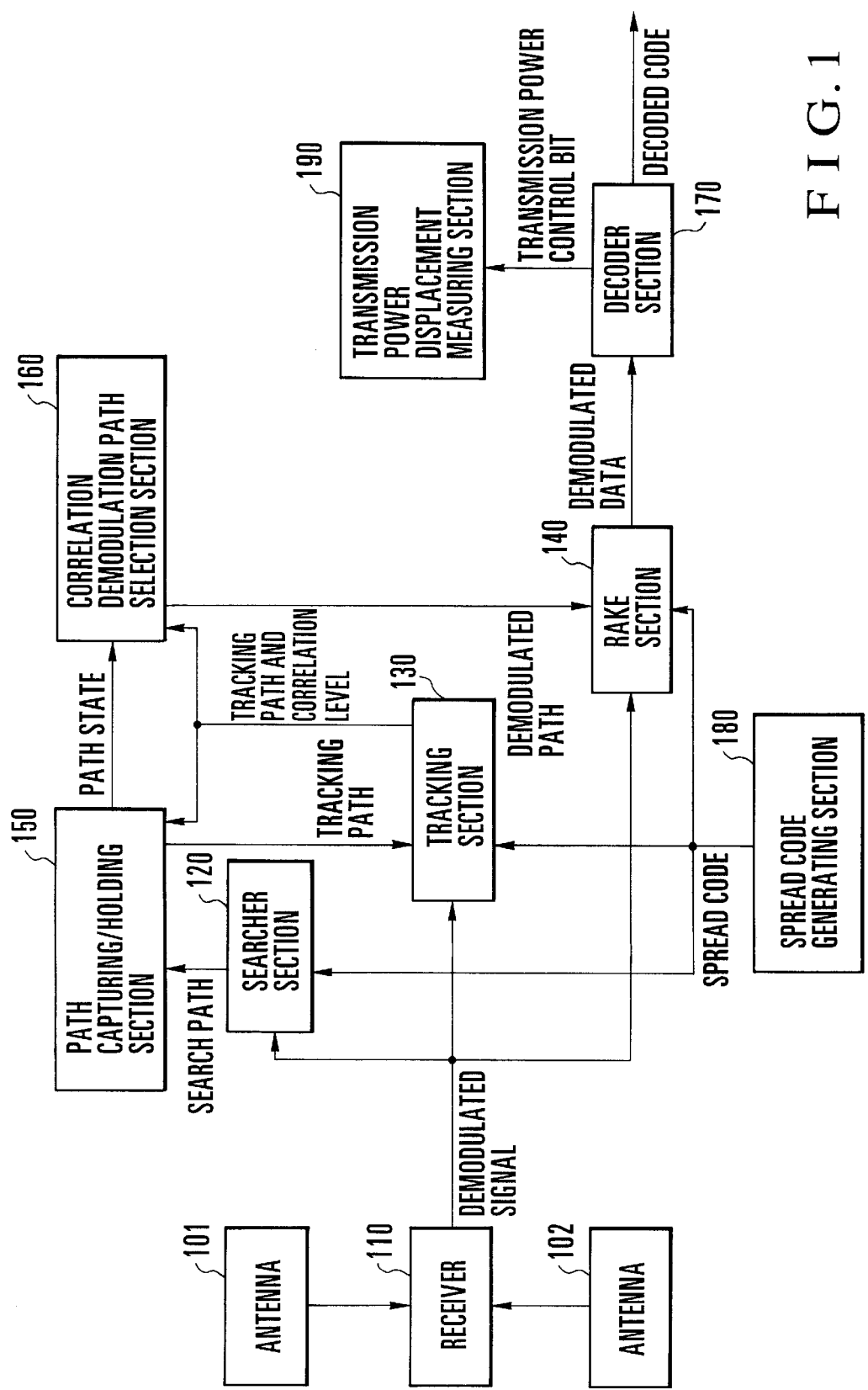
FIG. 1 is a block diagram showing the arrangement of a spread spectrum communication receiver according to an embodiment of the present invention.

FIG. 1 shows a spread spectrum communication receiver according to an embodiment of the present invention. Referring to FIG. 1, the signals received by space diversity antennas 101 and 102 are demodulated by a receiver 110 to be output as a demodulated signal.

A searcher section 120 correlates the demodulated signal output from the receiver 110 and the spread code generated by a spread code generating section 180 to detect correlation peaks in a search range, thereby obtaining a plurality of search paths having high correlation levels.

A path capturing/holding section 150 designates paths to be tracked by a tracking section 130 in accordance with the search paths output from the searcher section 120. In addition, the path capturing/holding section 150 captures/holds paths having correlation components on the basis of the tracking paths output from the tracking section 130.

The tracking section 130 receives the demodulated signal output from the receiver 110 and the spread code output from the spread code generating section 180, and tracks the plurality of paths designated by the path capturing/holding section 150. The tracking section 130 also obtains the correlation level of each tracking path.

A correlation demodulation path selection section 160 detects paths without any correlation component from the tracking paths on the basis of the correlation levels of the tracking paths, output from the tracking section 130, and the path states output from the path capturing/holding section 150, and removes the detected paths from the paths to be subjected to correlation demodulation rake synthesis.

A rake section 140 detects and rakes/synthesizes the plurality of demodulation paths designated by the correlation demodulation path selection section 160 in accordance with the demodulated signal output from the receiver 110 and the spread code output from the spread code generating section 180. The rake section 140 also obtains the correlation level of each demodulation path and outputs it as demodulated data.

A decoder section 170 decodes the demodulated data output from the rake section 140, and outputs the decoded data. At the same time, the decoder section 170 outputs a transmission power control bit contained in the decoded data. The spread code generating section 180 generates a spread code and outputs it to the searcher section 120, the tracking section 130, and the rake section 140, which de-spread the code.

A transmission power displacement measuring section 190 obtains a fading period by obtaining a transmission power displacement period on the basis of the transmission power control bit output from the decoder section 170. Although not shown, the obtained fading period may be output to the searcher section 120 and the path capturing/holding section 150 to be used for operation control for the respective sections.

The operation of the spread spectrum communication receiver having the above arrangement will be described next.

The signals received by the space diversity antennas 101 and 102 are demodulated by the receiver 110. The demodulated signal is then output. The searcher section 120 detects a plurality of peaks of the demodulated signal. As a result, a plurality of search paths are output to the path capturing/holding section 150. The path capturing/holding section 150 designates tracking paths to be tracked by the tracking section 130 from the search paths obtained by the searcher section 120.

The tracking section 130 receives the demodulated signal output from the receiver 110 and the spread code output from the spread code generating section 180, and tracks the plurality of paths designated by the path capturing/holding section 150. The tracking section 130 also obtains the correlation levels of the tracking paths and outputs the obtained levels to the path capturing/holding section 150 and the correlation demodulation path selection section 160.

The path capturing/holding section 150 captures/holds paths having correlation components on the basis of the tracking paths output from the tracking section 130, and outputs path states. The correlation demodulation path selection section 160 detects paths having no correlation components from the tracking paths on the basis of the correlation levels of the tracking paths, output from the tracking section 130, and the path states output from the path capturing/holding section 150. The correlation demodulation path selection section 160 then removes the paths having no correlation components and designates paths to be subjected to correlation demodulation rake synthesis to the rake section 140.

The rake section 140 receives the demodulated signal output from the receiver 110 and the spread code output from the spread code generating section 180, detects the plurality of demodulation paths designated by the correlation demodulation path selection section 160, and rakes/synthesizes them. The rake section 140 also obtains the correlation levels of the demodulation paths and outputs them as demodulation data.

The operations of the main components of this embodiment will be described in detail next.

The searcher section 120 detects paths separated from each other by one chip or more to prevent a plurality of detected paths from containing the same correlation component. The searcher section 120 detects a first search path having the largest correlation component in a search range first, and then detects a second search path having the second largest correlation component from a search range separated from the first search path by one chip or more. The searcher section 120 also detects a third search path from a search range separated from both the first and second search paths by one chip or more. A plurality of search paths are detected in this manner. Therefore, the detected paths do not contain the same correlation component. This realizes efficient detection of paths.

In the searcher section 120, the profile averaging time in detecting search paths can be changed in accordance with the correlation level. When the correlation level is low, the averaging time is set to be long, and vice versa.

In addition, a profile in detecting search paths may be averaged over a fading period. According to this method, the fading period information obtained by the transmission power displacement measuring section 190 is input to adjust the profile averaging time, thereby adaptively reducing the influences of fading variations.

At the same time, the tracking section 130 performs control to separate a plurality of paths (to be tracked) from each other by one chip or more. If, for example, the chip phase difference between the first tracking path having the largest correlation component and the second tracking path, whose chip phase is nearest to that of the first tracking path, is less than one chip, the tracking section 130 separates the chip phase of the second tracking path from that of the first tracking path by one chip. If the chip phase difference between the third tracking path, whose chip phase is second nearest to that of the first tracking path, and the first or second tracking path is less than one chip, the tracking section 130 separates the chip phase of the third tracking path from the first or second tracking path, whose chip phase is separated from that of the third tracking path by less than one chip, by one chip. In this manner, the tracking section 130 separates a plurality of paths (to be tracked) from each other by one chip or more.

Tracking path capturing/holding processing performed by the path capturing/holding section 150 will be described with reference to the flow chart of FIG. 2. Backward protection (to be described later) is performed in detecting the coincidence between paths. Forward protection (to be described later) is performed in detecting the loss of a path.

First of all, a plurality of search paths are detected (step A1). Forward protection processing is then performed in units of tracking paths (step A2). Backward protection processing is performed in units of tracking paths (step A3). Search path assignment processing is performed in units of tracking paths (step A4). The path capturing/holding section 150 captures/holds tracking paths in such a sequence.

Tracking path state transition will be described next with reference to the flow chart of FIG. 3. Path states are classified into four states, i.e., "0: complete incoincident state"; "1: backward protection state"; "2: complete protection state"; and "3: forward protection state".

"0: complete incoincident state" indicates a state in which no tracking path has coincided with any search path (step B1). In this case, coincidence between a tracking path and a search path indicates that the tracking path and the search path fall within a range of about one chip. If, for example, a search path falls within ±1 chip of a tracking path, these paths are considered to coincide with each other.

"1: backward protection state" indicates a state in which a tracking path has consecutively coincided with one or more search paths, but the coincident state has not reached a backward protection count. When the coincident state has not reached the backward protection count, "0: complete incoincident state" is determined (step B2).

"2: complete protection state" indicates a state in which a tracking path has coincided with a search path (step B3).

"3: forward protection state" indicates a state in which no tracking path has coincided with any search path, but the incoincident state has not reached to a forward protection count. When the incoincident state reaches the forward protection count, "0: complete incoincident state" is determined. When a tracking path coincides with a search path before the incoincidence state reaches the forward protection count, "2: complete protection state" is determined (step B4).

Figure 4:
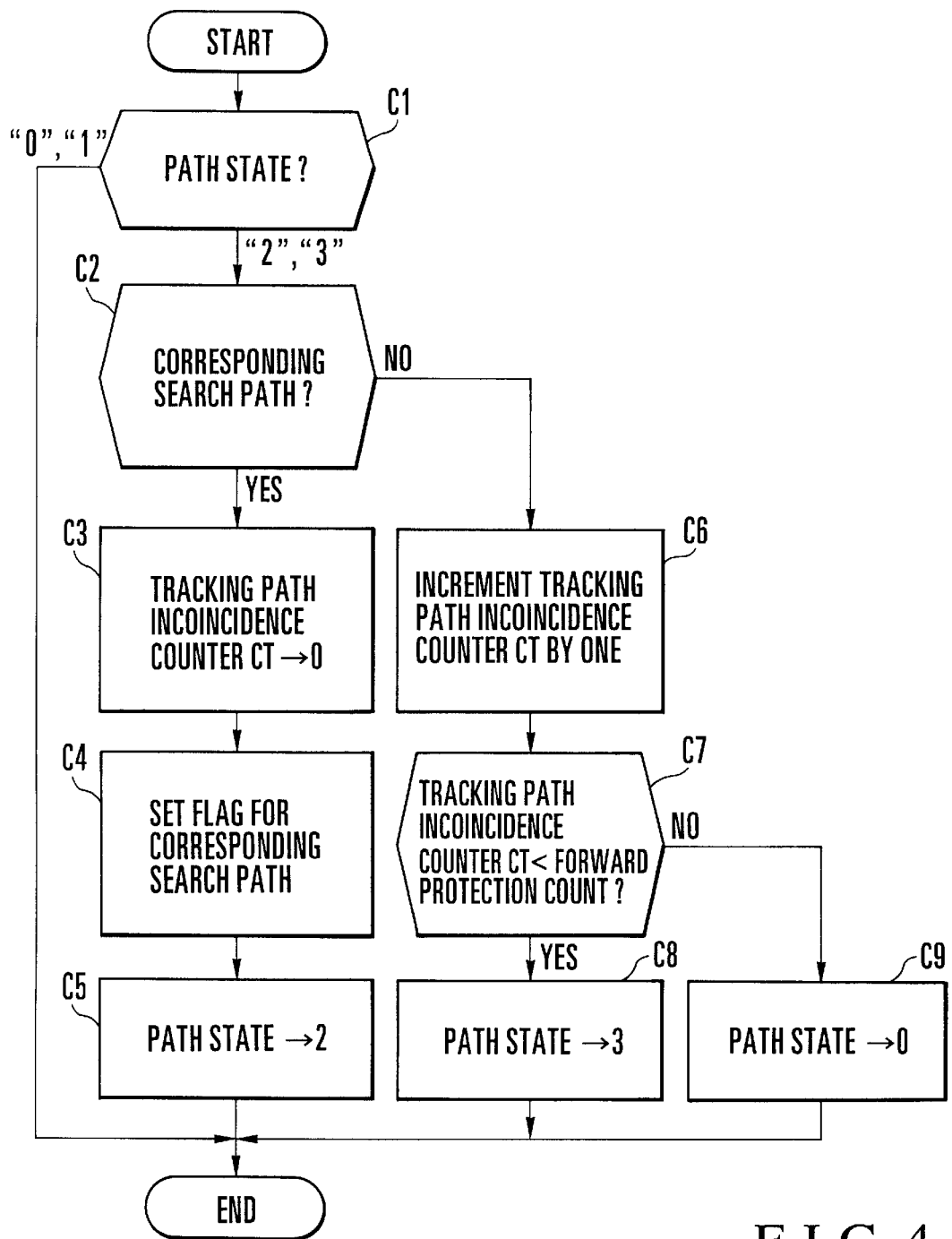
FIG. 4 is a flow chart for explaining forward protection processing in the receiver in FIG. 1.

A method of performing forward protection by using such state transition will be described with reference to the flow chart of FIG. 4.

First of all, the path state is checked (step C1). If the path state is "0: complete incoincident state" or "1: backward protection state", since this state does not correspond to forward protection processing, the forward protection processing is immediately terminated. If the path state is "2: complete protection state" or "3: forward protection state", it is checked whether any search path coincides with the corresponding tracking path (step C2).

If the presence of the corresponding search path is determined, a tracking path incoincidence counter (CT) is reset to 0 (step C3), and a flag is set for the corresponding search path (step C4). The path state is then set to "2: complete protection state" (step C5), and the forward protection processing is terminated.

If it is determined in step C2 that no search path coincides with the tracking path, the tracking path incoincidence counter (CT) is incremented by one (step C6). It is then checked whether the value of the tracking path incoincidence counter (CT) has reached the forward protection count (step C7).

If the value of the counter has reached the forward protection count, the path state is set to "0: complete incoincident state" (step C9), and the forward protection processing is terminated. If the value has not reached the forward protection count, the path state is set to "3: forward protection state" (step C8), and the forward protection processing is terminated.

Figure 5:
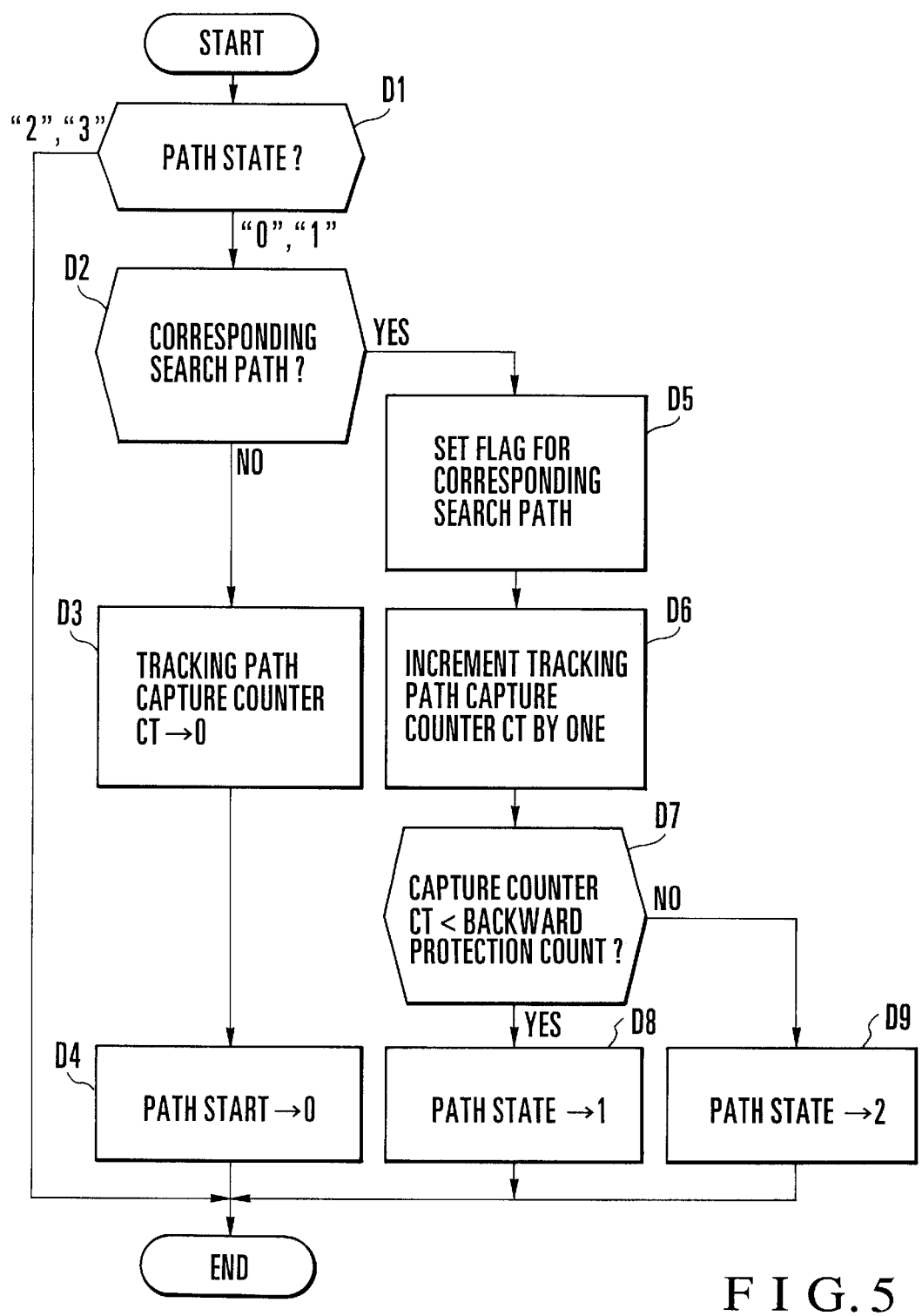
FIG. 5 is a flow chart for explaining backward protection processing in the receiver in FIG. 1.

A method of performing backward protection will be described next with reference to the flow chart of FIG. 5.

First of all, the path state is checked (step D1). If the path state is "2: complete protection state" or "3: forward protection state", since this state does not correspond to backward protection processing, the backward protection processing is immediately terminated. If the path state is "0: complete incoincident state" or "1: backward protection state", it is checked whether any search path coincides with the corresponding tracking path (step D2).

If the presence of the corresponding search path is determined in step D2, a flag is set for the corresponding search path (step D5). A tracking path capture counter (CT) is then incremented by one (step D6). It is checked whether the value of the tracking path capture counter (CT) has reached the backward protection count (step D7).

If the value of the counter has reached the backward protection count, the path state is set to "2: complete protection state" (step D9), and the backward protection processing is terminated. If the value has not reached the backward protection count, the path state is set to "1: backward protection state" (step D8), and the backward protection processing is terminated.

If it is determined in step D2 that no search path coincides with the tracking path, the tracking path capture counter (CT) is reset to 0 (step D3). Thereafter, the path state is set to "0: complete incoincident state" (step D4), and the backward protection processing is terminated.

If the protection counts in the above forward protection processing and backward protection processing are properly updated in the following manner, better effects can be obtained.

By inputting the fading period information obtained by the transmission power displacement measuring section 190, the traveling speed of a mobile unit is obtained from the fading period. The forward and backward protection counts are adaptively updated in accordance with the traveling speed. If, for example, the moving speed is high, the backward protection count is increased to decrease path detection errors. If the speed is low, the backward protection count is decreased to increase the path updating speed.

The forward and backward protection counts are adaptively updated in accordance with the reception level. If, for example, the reception level is low, the backward protection count is increased to decrease path detection errors. If the reception level is high, the backward protection count is decreased to increase the path updating speed.

A few methods of acquiring tracking paths can be applied to the path capturing/holding section 150. According to the first method, a search path that coincides with a tracking path is selected from search paths without any flags. With this operation, a one-to-one correspondence is established between the tracking paths and the search paths. With this one-to-one correspondence established between the tracking paths and the search paths, when the search paths are equal in number to the tracking paths, a new search path having a high correlation level can be quickly assigned to a tracking path.

According to the second method, detection of a search path that coincides with a tracking path is determined, regardless of the state of the flag of the search path, by checking whether the tracking path is included in any one of a plurality of search paths. With this operation, a delayed profile has a trapezoidal shape. This prevents a tracking path from being released from the held state in the loss of any corresponding search path when a plurality of tracking paths are adjacent to each other.

Figure 6:
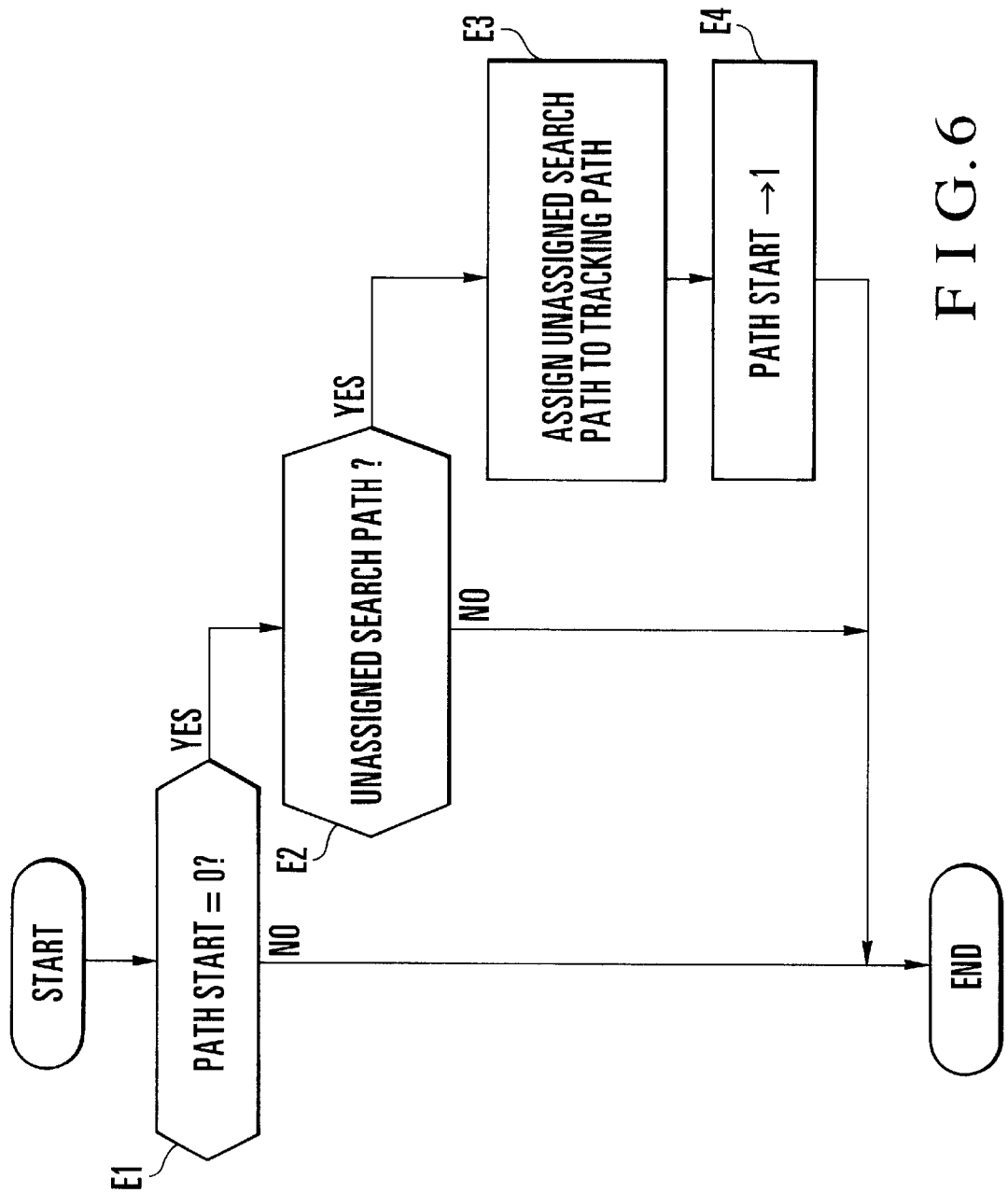
FIG. 6 is a flow chart for explaining an example of search path assignment processing in the path capturing/holding section in FIG. 1.
Figure 7:
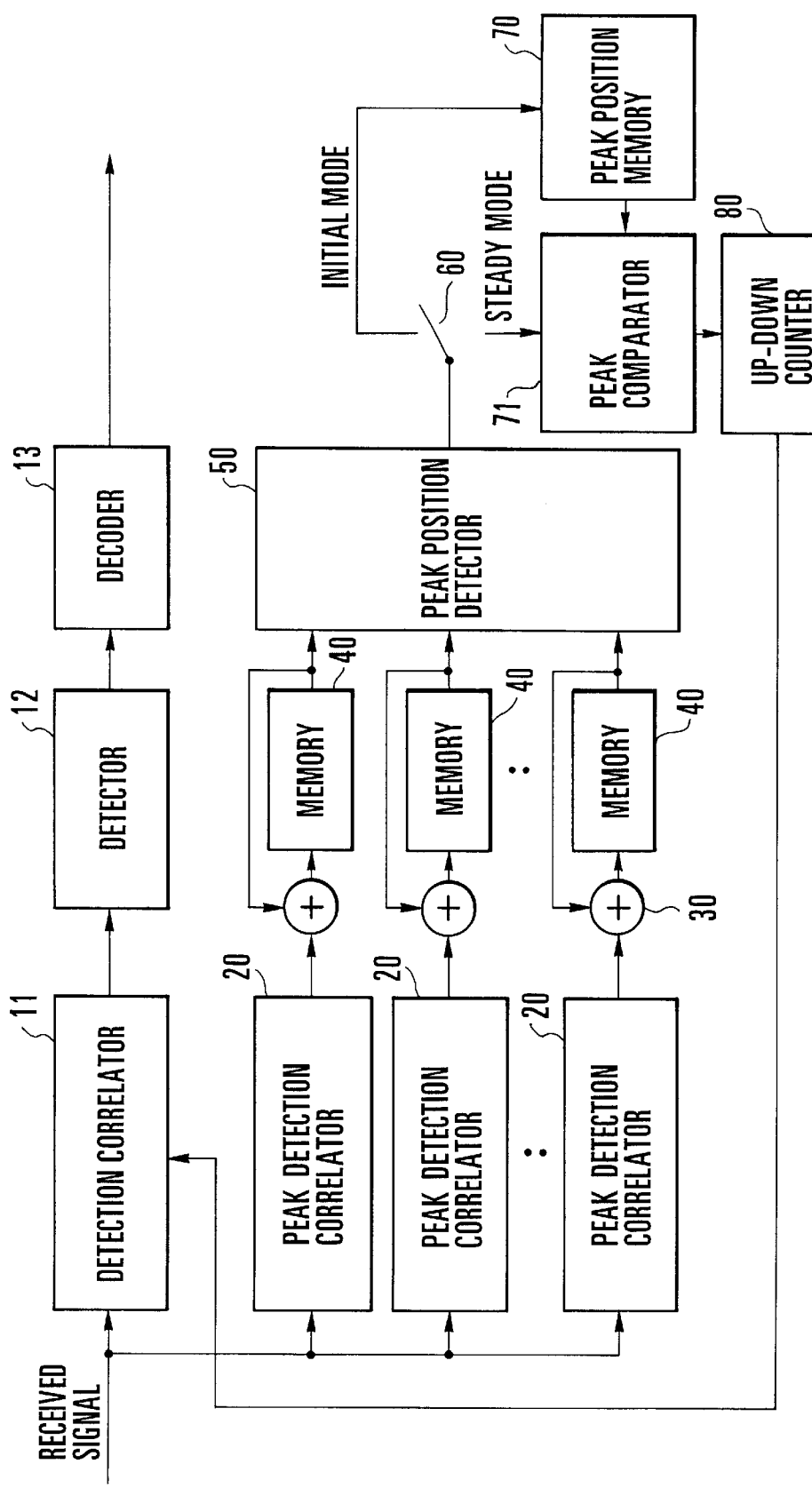
FIG. 7 is a block diagram showing the arrangement of a conventional spread spectrum communication receiver.

Search path assignment processing based on the first method applied to the path capturing/holding section 150 will be described with reference to the flow chart of FIG. 6.

First of all, the path state is checked (step E1). If the path state is not "0: complete incoincident state", the search path assignment processing is terminated. If the path state is "0: complete incoincident state", it is checked whether any unassigned search path is present. The presence/absence of an unassigned search path is determined by checking the flag for each search path. That is, if no flag is set for a given search path, the presence of an unassigned search path is determined (step E2).

If unassigned search paths are present, one of the unassigned search paths which has the highest correlation level is assigned to this tracking path (step E3). Thereafter, the path state is set to "1: backward protection state" (step E4), and the search path assignment processing is terminated. If there is no unassigned search path, the search path assignment processing is terminated.

The correlation demodulation path selection section 160 checks whether the paths used for correlation demodulation rake synthesis performed by the rake section 140 have correlation components, and removes paths having no correlation components from the paths to be subjected to rake synthesis. A few methods can be used for this processing.

In the first method, a tracking path having a correlation level equal to or lower than a given threshold is removed from the paths to be subjected to rake synthesis. In the second method, whether to remove a given path is determined on the basis of the state of a tracking path. In the third method, only higher-order tracking paths are always used for rake synthesis. For example, only four higher-order paths are used for rake synthesis. The first, second, and third methods can be used in combination.

In the above second method, a few methods can be used. According to the first method, paths in the complete protection state and the forward protection state are used for rake synthesis. This method is effective in reducing noise. According to the second method, paths in the backward protection state, the complete protection state, and the forward protection state are used for rake synthesis. According to the third method, all paths are used for rake synthesis regardless of the path states. The third method is effective in acquiring correlation components.

As described above, in the spread spectrum communication receiver according to the present invention, the path capturing/holding section extracts target signals from the search paths detected by the searcher section and the tracking paths tracked by the tracking section by forward protection and backward protection. The correlation demodulation path selection section then removes paths except for paths for the target signals and selects paths to be demodulated. Thereafter, the rake section perform rakes/synthesizes the selected paths. With this arrangement, no deterioration in reception characteristics occurs. In addition, since the forward and backward protection counts are properly changed in accordance with the external conditions, an improvement in path detection performance and an increase in path changing speed can be attained.

As described above, in the spread spectrum communication receiver according to the present invention, the path capturing/holding section extracts target signals from the search paths detected by the searcher section and the tracking paths tracked by the tracking section by forward protection and backward protection. The correlation demodulation path selection section then removes paths except for paths for the target signals and selects paths to be demodulated. Thereafter, the rake section perform rakes/synthesizes the selected paths. A window corresponding to about one chip and serving to detect paths is set. This receiver has the forward protection function of detecting the presence of multipath when paths are consecutively present within the range of this window, and the backward protection function of detecting the loss of multipath when no paths are consecutively present within the range of the window. The forward and backward protection counts are properly changed in accordance with the external conditions. As a result, even in the presence of a plurality of paths each having a correlation level as low as the noise level under a multipath fading state, the demodulation characteristics can be improved.

According to the present invention, the reception level can be increased by about 3 dB as compared with the prior art. This means that the transmission power can be reduced by 3 dB per moving unit, and the interference with other mobile units can be reduced by 3 dB as compared with the prior art. That is, the subscriber capacity can be increased twice that in the prior art.

What is claimed is:

1. A spread spectrum communication receiver comprising:

spread code generating means for generating a spread code;

demodulation means for demodulating a received signal and outputting a demodulated signal;

searcher means for obtaining a plurality of search paths separated from each other by not less than one chip from a search range on the basis of the demodulated signal output from said demodulation means and the spread code output from said spread code generating means;

tracking means for tracking a plurality of tracking paths separated from each other by not less than one chip on the basis of the demodulated signal output from said demodulation means and the spread code output from said spread code generating means, and obtaining correlation levels of the tracking paths;

path capturing/holding means for comparing the search paths output from said searcher means with the tracking paths output from said tracking means, and capturing/holding a plurality of paths on the basis of the comparison result, said path capturing/holding means performing backward protection in detecting coincidence between paths, performing forward protection in detecting loss of a path, and classifying path captured/held states of tracking paths into a complete incoincident state, a forward protection state, a complete protection state, and a forward protection state, thereby obtaining a path state;

correlation demodulation path selection means for selecting paths to be subjected to correlation demodulation on the basis of the path state output from said path capturing/holding means and the correlation levels output from said tracking means;

rake means for detecting demodulated paths designated by said correlation demodulation path selection means on the basis of a correlation between the demodulated signal output from said demodulation means and the spread code output from said spread code generating means, and performing rake synthesis of the demodulated paths, thereby outputting demodulated data; and decoding means for decoding the demodulated data output from said rake means, and outputting decoded data.

2. A receiver according to claim 1, further comprising transmission power displacement measuring means for measuring a transmission power displacement upon reception of a transmission power control bit, and obtaining a fading period on the basis of a change in the measured transmission power displacement, and wherein said decoding means outputs a transmission power control bit contained in decoded data to said transmission power displacement measuring means.

3. A receiver according to claim 2, wherein said searcher means averages a profile in obtaining search paths over the fading period output from said transmission power displacement measuring means.

4. A receiver according to claim 3, wherein said searcher means adjusts a profile averaging time in obtaining search paths in accordance with the fading period output from said transmission power displacement measuring means.

5. A receiver according to claim 3, wherein said searcher means adjusts a profile averaging time in obtaining search paths in accordance with a correlation level.

6. A receiver according to claim 1, wherein said path capturing/holding means compares tracking paths with search paths in one-to-one correspondence, and determines detection of a path when a tracking path and a search path are located near within less than ±1 chip.

7. A receiver according to claim 1, wherein said path capturing/holding means determines detection of a path when a tracking path is contained in any one of a plurality of search paths, and the tracking path and the search path are located near within less than ±1 chip.

8. A receiver according to claim 1, wherein said path capturing/holding means changes a backward protection count used for backward protection and a forward protection count for forward protection in accordance with a correlation level.

9. A receiver according to claim 2, wherein said path capturing/holding means changes a backward protection count used for backward protection and a forward protection count for forward protection in accordance with a fading period output from said transmission power displacement measuring means.

10. A receiver according to claim 1, wherein said correlation demodulation path selection means removes a path whose correlation level has not reached a predetermined level, a path whose path state is the complete incoincident state, and a path whose path state is the backward protection state from paths to be selected as paths to be subjected to correlation demodulation.

* * * * *